United States Patent
Hickey et al.

(10) Patent No.: US 10,223,224 B1
(45) Date of Patent: Mar. 5, 2019

(54) METHOD AND SYSTEM FOR AUTOMATIC DISK FAILURE ISOLATION, DIAGNOSIS, AND REMEDIATION

(71) Applicant: EMC Corporation, Hopkinton, MA (US)

(72) Inventors: Charles Hickey, Aptos, CA (US); Alice Cuicui Zhao, Beijing (CN); Jose Medina, San Mateo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 100 days.

(21) Appl. No.: 15/194,464

(22) Filed: Jun. 27, 2016

(51) Int. Cl.
   *G06F 11/00* (2006.01)
   *G06F 11/26* (2006.01)
   *G06F 3/06* (2006.01)

(52) U.S. Cl.
   CPC ............ *G06F 11/26* (2013.01); *G06F 3/0619* (2013.01); *G06F 3/0653* (2013.01); *G06F 3/0689* (2013.01)

(58) Field of Classification Search
   CPC ...... G06F 11/26; G06F 3/0619; G06F 3/0653; G06F 3/0689
   See application file for complete search history.

(56) References Cited

U.S. PATENT DOCUMENTS

| | | | | |
|---|---|---|---|---|
| 5,935,261 A * | 8/1999 | Blachek | ............. | G11B 20/1816 714/15 |
| 7,136,768 B1 * | 11/2006 | Shah | ..................... | G06F 11/008 702/115 |
| 7,340,642 B1 * | 3/2008 | Coatney | ............... | G06F 11/2094 711/114 |
| 7,447,957 B1 * | 11/2008 | Cooley | ............... | G06F 11/1012 714/718 |
| 7,526,683 B1 * | 4/2009 | Votta, Jr. | ................ | G06F 11/008 714/42 |
| 7,743,284 B1 * | 6/2010 | Taylor | .................. | G06F 11/0727 714/42 |
| 7,908,526 B2 * | 3/2011 | Guha | ..................... | G06F 11/008 714/54 |
| 7,921,332 B2 * | 4/2011 | Lee | ......................... | G11B 19/04 714/27 |

(Continued)

OTHER PUBLICATIONS

CAFC,*Electric Power Group, LLC v. Alstom S.A.*, pp. 1-12 (Year: 2016).*

*Primary Examiner* — Marc Duncan
*Assistant Examiner* — Jonathan D Gibson
(74) *Attorney, Agent, or Firm* — Womble Bond Dickinson (US) LLP

(57) ABSTRACT

According to one embodiment, a test result of a first disk that was removed from a storage system and tested at a remote testing facility is received. A data analysis is performed on operational statistics data associated with the first disk based on one or more predetermined data patterns, where the operational statistics data was periodically collected from the storage system during operations of the storage system. A failure category of the first disk is determined based on the data analysis by comparing the operational statistics data against the predetermined data patterns. At least one of the data patterns is adjusted for subsequent determination of failure categories in view of an analysis result of the analysis, the failure category, and the testing result received from the testing facility.

18 Claims, 13 Drawing Sheets

(56) References Cited

U.S. PATENT DOCUMENTS

| | | | | |
|---|---|---|---|---|
| 8,719,320 B1* | 5/2014 | Brooker | ............... | G06Q 10/10 |
| | | | | 707/827 |
| 9,229,796 B1* | 1/2016 | Ma | ............... | G06F 11/008 |
| 9,542,296 B1* | 1/2017 | Engers | ............... | G06F 11/3452 |
| 2003/0093721 A1* | 5/2003 | King | ............... | G11B 25/043 |
| | | | | 714/42 |
| 2004/0260984 A1* | 12/2004 | Lee | ............... | G11B 19/04 |
| | | | | 714/48 |
| 2005/0114593 A1* | 5/2005 | Cassell | ............... | G06F 3/0605 |
| | | | | 711/114 |
| 2007/0079170 A1* | 4/2007 | Zimmer | ............... | G06F 11/008 |
| | | | | 714/6.23 |
| 2010/0275057 A1* | 10/2010 | Durica | ............... | G06F 11/2094 |
| | | | | 714/6.32 |
| 2011/0149424 A1* | 6/2011 | Dalphy | ............... | G11B 27/36 |
| | | | | 360/31 |

* cited by examiner

METHOD AND SYSTEM FOR AUTOMATIC DISK FAILURE ISOLATION, DIAGNOSIS, AND REMEDIATION

FIELD OF THE INVENTION

Embodiments of the present invention relate generally to data storage systems. More particularly, embodiments of the invention relate to automatically determining categories of disk failures.

BACKGROUND

Since the dawn of the computer age hardware components have been malfunctioning and software has been attempting to deal with it. Storage devices such as hard-disk and solid-state drives have a limited life and are the focus of much work to detect, correct, and preemptively replace those components when defective. The problem is that with all this effort is software frequently gets it wrong with false-failure rates often over 50%. The term No Trouble Found (NTF) is used in the electronics industry to describe components that have been returned for replacement but operate properly when tested.

The general problem is that the software that removes faulty components from services relies on a static model, i.e. so many errors in so many minutes from a particular device results in its indictment as the culprit. The reality is that the behavior of components, the OS software that monitors them, and the procedures that qualify them are all in a constant state of change. There has been a lack of efficient ways to determine the faulty disks from those that have been falsely-failed.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
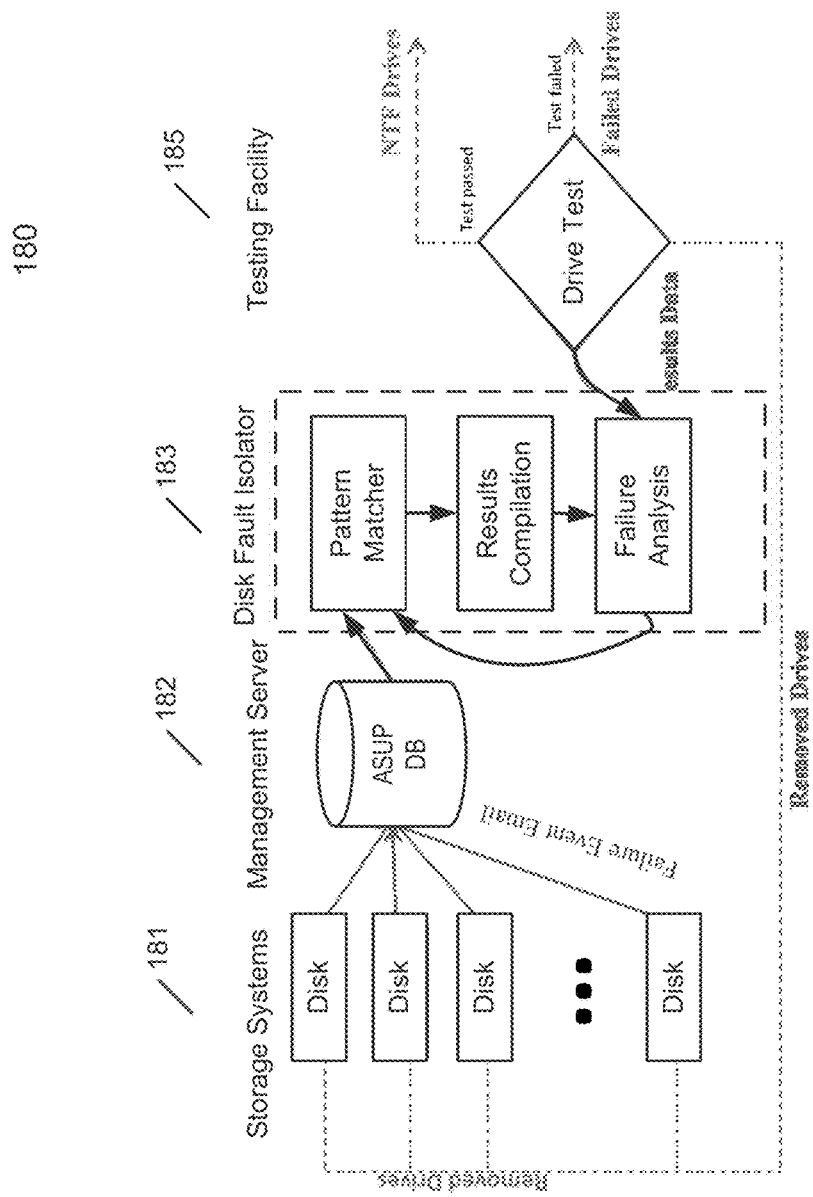
FIG. 1 is a diagram illustrating a disk failure analysis system configuration according to one embodiment of the invention.

According to some embodiments, a disk fault isolation mechanism is utilized to isolate the disks that are indeed failed from those that are not (e.g., false alarm disks). FIG. 1 is a block diagram illustration a disk fault isolation system configuration according to one embodiment of the invention. Referring to FIG. 1, when storage system 181 detects that a disk drive has an increasing error rate it will remove the drive from service (aka "fail the drive) and that will start the following activities. An email is sent to an administrative automated support (ASUP) database of a management or administrative server 182, and this in turn will trigger a service-engineer call at the customer site to replace the failed device (indicated in red below). The removed drive will be tested at testing facility 184, and if it fails to pass the test it is discarded. Drives which pass the test are declared "NTF" and returned to service. The disk fault isolator 183 introduces a new stage of processing by evaluating the events leading up to the disk replacement and tracking that against known true-failure and NTF event patterns.

Storage systems or servers upload to a central ASUP server 182. This data is parsed and archived into a database. This telemetry consists of an alert email transmitted in real-time when a component has been removed from service, and a daily dump of statistics on a large number of parameters. The fault isolator 183 uses both the failure-alerts and the daily data in reconstructing a device failure incident. The fault isolator 183 draws on this data via a database schema. Data consisting of a list of drives by serial number that have passed or failed the manufacturing test allow adjustments to the pattern matching algorithms that identify NTF causing factors.

One of the most basic issues that is at the heart of many of these problems is the modern operating systems are good at driving I/O requests down the stack but not so good at dealing with errors which come from the bottom up. I/O reads and writes originate high-up in the application and propagate down the stack with great efficiency. Errors occur most frequently in the lowest element—the hard-disk, and bubble up poorly to the higher levels. At each level of this process effort is made to correct or otherwise remediate the error, but these efforts are largely uncoordinated between layers and the ultimate effect can be unpredictable and non-deterministic in practice.

To properly investigate the sources of false-failures as well as the effectiveness and failure trends of properly indicted components all available data must be assembled for analysis. This includes: 1) information from all layers of the operating system must be combined to reconstruct a component failure event; 2) version information is needed on all hardware, firmware and software components so behavior changes and error trends can be tracked; 3) data on components failed by the operating system and later judged as NTF needs to be fed back in to the system; and 4) patterns of known true and false failure conditions need to be automatically applied. The fault isolator 182 is a web enabled database application that runs on a daily process investigating drive-failure events by applying various pattern matching algorithms to classify and categorize the events leading up to that event taking all the above considerations into mind. A daily report is published in HTML with links to detailed analysis tools allowing new patterns of failure to be detected.

Figure 2:
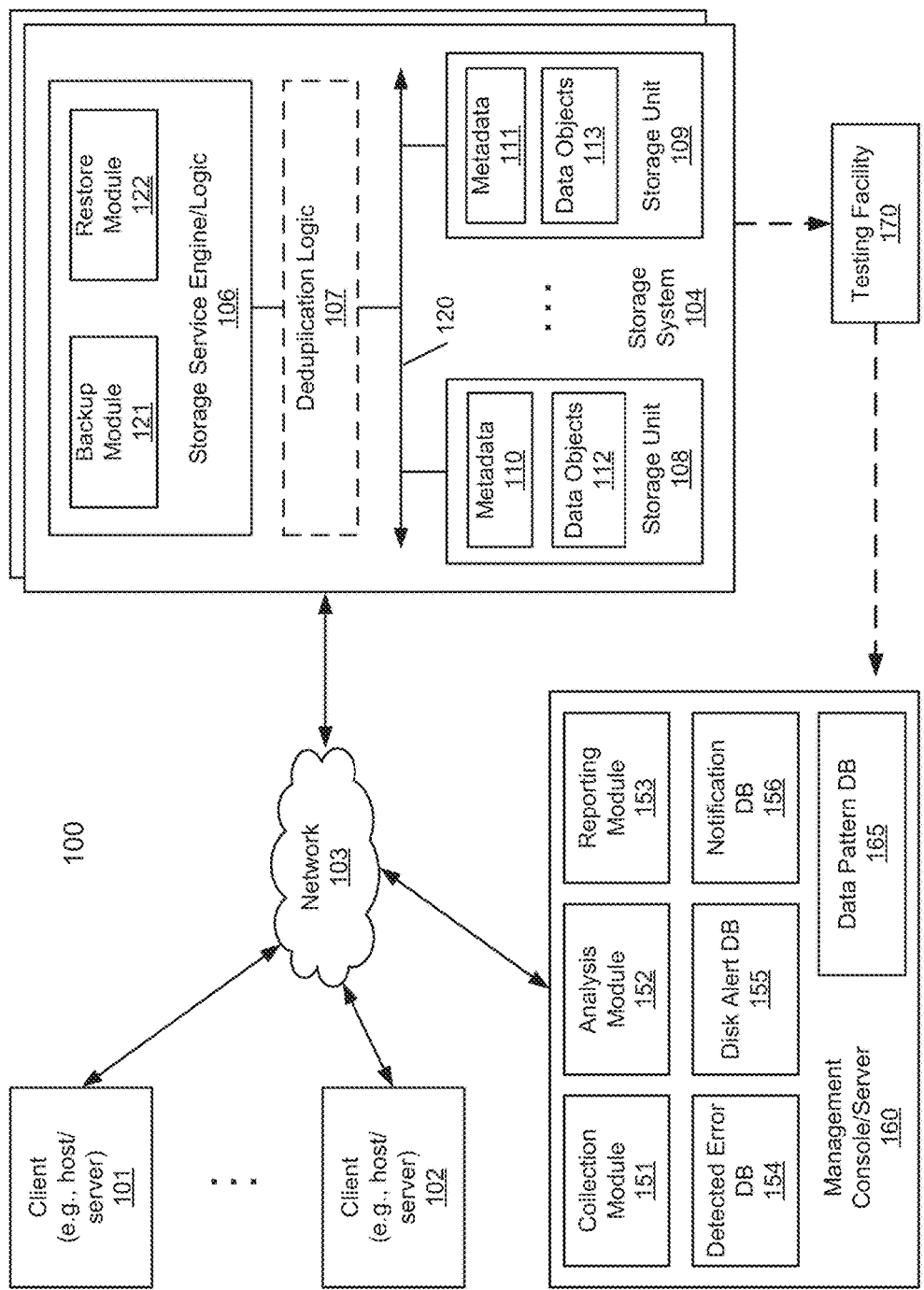
FIG. 2 is a block diagram illustrating a storage system according to one embodiment of the invention.

FIG. 2 is a block diagram illustrating a storage system according to one embodiment of the invention. System 100 may represent at least a portion of system 180 as shown in FIG. 1. Referring to FIG. 2, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

In one embodiment, each of storage systems 104 may further include a reporting module (not shown) that periodically reports by sending operational statistics data to management server 160, which may be collected by data collection module 151. The operational statistics data may be stored in a database such as detected error database 154, disk alert database 155, and notification database 156. Databases 154-156 may be collectively referred to as the ASUP database described above.

When a disk of storage system 104 is considered failed, the disk is removed from storage system 104 and sent to testing facility 170 for testing. In addition, the operational statistics data associated with the alleged failed disk, which was collected overtime and stored in databases 154-156, is analyzed by analysis module 152 based on data patterns stored in data pattern database 165, in view of the testing result received from testing facility. Data patterns stored in data pattern database 165 may be compiled based on historic known operational statistics data. The goal of analysis is to determine exactly what caused the disk failure or whether the disk indeed failed at all. The result of the analysis is compared with the actual testing result received from testing facility 170. Any discrepancy between the two may be used to adjust the corresponding data patterns for future determination. A report of the analysis can be generated by reporting module 153, for example, to be transmitted to a requester's client device (e.g., client devices 101-102) to be displayed therein.

According to some embodiments, disk failure can be categorized in different categories. The term SMART (self-monitoring, analysis and reporting technology) below refers to a monitoring system included in computer hard disk drives (HDDs) and solid-state drives (SSDs) that detects and reports on various indicators of drive reliability, with the intent of enabling the anticipation of hardware failures. For example, "RAS" is called media category in this document, since they are related to the drive having problems reading the disk medium resulting in an increase in the disk drive's internal Re-Allocated Sector count (i.e., RAS). The "DROP" category was named that because the drives appears to drop-dead suddenly or just drop off from existence and are referred to here as the Absent class because of their association with the absent disk alert. The CONN class is called Connectivity because of its association with problems with the cabling, connectors, expanders between the host and the drive. The "NON-DISK" categories called "Other" though most cases are indeed not related to a disk problem. The table below lists some of the categories according to some embodiments:

| Class | Category | Preceding Symptom | Failure Event | Occurrence Rate | NTF Rate | Failure Rate |
|---|---|---|---|---|---|---|
| Media | RAS-M | RAS increase | DD_DRAID fails - medium error threshold exceeded | 20% | 13% | 88% |
| " | RAS-T | RAS increase | DD_DRAID fails - timeout error threshold exceeded | 3%% | 50% | 50% |
| " | RAS-W | RAS increase | DD_RAID fails - write error detected | 14% | 45% | 55% |
| " | RAS-D | RAS increase | No subsequent SMART Data | 6% | 20% | 80% |
| " | RAS-S | RAS increase | Single path alert | 1% | 50% | 50% |
| Absent | DROP-U | No preceding error indication | Disk is absent alert | 17% | 42% | 58% |
| " | DROP-C | SMART CRC Errors | Disk has failed alert | 3% | 25% | 75% |
| " | DROP-T | SMART Temperature Excursion | Disk is absent alert | 1% | 50% | 50% |
| " | DROP-P | SMART Power-cycle increase | Disk is absent alert | 2% | 0% | 100% |
| " | DROP-D | No SMART data available | Disk is absent alert | 2% | 0% | 100% |
| Connection | CONN-S | Appears healthy - no errors indicated | Single path disk alert | 4% | 100% | 0% |
| " | CONN-I | Multipath failures and no RAS/Medium errors | Disk is failed alert. DD_RAID Fails with write-errors | 13% | 86% | 14% |
| " | CONN-P | SMART shows power-cycles | Disk is failed alert. DD_RAID Fails with write-errors | 2% | 100% | 0% |
| Other | WRONGD | Drive in RMA # does not match alert | Physical inspection of disk container | 27% | 73% | 10% |
| " | USER | User failed disk | Alert: Disk has failed and should be replaced | 1% | 0% | 100% |
| " | SHELF | Multiple disk alerts on same shelf within a minute | Alert: Disk has failed and should be replaced | 20% | 80% | 3% |
| " | SLOWD | Disk performance busy Z-score exceeds 2.5 | DDFS Panics | — | — | — |
| " | INVALID | Cannot be analyzed | | — | — | — |

Note that the above table rates (i.e. Occurrence, NTF, Failure) provided are at the present time, but vary as time proceeds. The definitions of the statistical measure can be defined as follows, which may be calculated based on mean and standard deviation using certain algorithms, according to some embodiments of the invention:

| Field Name | Description | Problem Indicated |
| --- | --- | --- |
| SMART Hours delta: | Indicates the number of hours passed since previous ASUP | Missing or excessive time. Hours elapsed should match time between ASUPs |
| SMART RAS delta: | Count of additional sectors remapped by drives reallocation mechanism | The surest sign of a media problem on the disk and instant qualifier for "Media" class error designation |
| SMART CRC delta: | Count of additional CRC error detected by the drive | Error indicating connectivity problem of drive with mounting, or cable on path to drive |
| SMART RAS Evt delt: | Change in count of drive's bad sector remapping mechanism | Sign of Media related drive problems and usually indicated with change in RAS |
| SMART Pending delta: | Count of sectors to re-map and awaiting corrected data from host | Non-zero value usually indicated aborted recovery attempt by host, like when a drive is failed |
| SMART Uncorrec Sect: | Count of sectors not yet recovered by host | Generally a sign of a failed drive, and not good on an in-use drive |
| SMART Temp delta: | Change of enclosure temperature detected by drive | Temperature swings under 4 degree normal, over 4 indicative of situation needing correction |
| SMART Power Cycles: | Count of times drive has been powered-up | Change is a sign of a drive problem when other drives in shelf have not seen a change in this value |
| RAID Medium Errors: | Raid detected medium error (ECC error reading sector) from drive | Indicative of Medium class failure categories |
| RAID Timeout Errors: | I/O request by RAID timed-out | Indicative of either Medium or Connection class failure |
| RAID Other Errors: | Other errors reported by SCSI to RAID | Generally indicative of drive, or connection path problem |
| RAID Data Errors: | RAID detected mismatch of data returned SCSI and what was expected | Drive and HBA problems |
| RAID Hardware Errors | Get definition | Disk failure |
| RAID Connection Ers: | Count of connection errors returned from SCSI layer | Usually indicative of a Connection class failure |
| RAID_Kernel_Messges: | Count of DD_RAID messages found in kern.info | Useful indication of RAID detected problem when a SUB is not present, or the drive was removed or died prior to ASUP, erasing counts of above RAID errors. |
| Multipath Failures: | Count of times Multipath failed a drive | Indicative of connection, absent, and mishandled medium error recovery. |
| Bytes R/W Rank: | Rank of device in dg of count of bytes read/written | Not currently correlated with disk failure |
| Busy | Rank of device in dg by slowness since device discovered | A #1 ranking is only indicative of a slow drive if its z-score exceeds 2.5 |
| Usage: | Rank of device in dg by slowness over last day | A #1 ranking is only indicative of a slow drive if its z-score exceeds 2.5 |
| SSM Disk Health: | Drvmon'd assessment of disk well being | Correlation not yet made to disk failure but we expect to see one as data is accumulated |
| DISK-STAT DID_ERR: | The counts of host errors - check the trace for the actual host error codes. | Depends on the error code values found in the trace - use scsi.h to decode |
| DISK-STAT DRV_ERR: | The counts of drive errors - check the trace for the actual drive error codes. | Depends on the error code values found in the trace - use scsi.h to decode |
| DISK-STAT MSG_ERR: | The counts of message errors - check the trace for the actual message error codes. | Depends on the error code values found in the trace - use scsi.h to decode |

-continued

| Field Name | Description | Problem Indicated |
|---|---|---|
| DISK-STAT TGT_RST: | Count of target resets | Small counts on the order of 1-2 are normal, above that indicates a drive or connectivity problem |
| DISK-STAT TGT_RST_FAIL: | Count of failed target resets | Sever drive, connectivity or HBA problems |
| DISK-STAT RTY: | Not currently used | Not currently used |
| DISK-STAT MEDIUM_ERR: | A drive ECC error, usually on read | Single digit medium error counts are normal, but if there is a drive failure, immediately places that failure in the Media class |
| DISK-STAT ABORTED_CMD: | Aborted command counts | Associated with error recovery usually indicating a drive or connectivity problem |
| DISK-STAT ICRC_ERR: | Count of CRC errors in communication with drive | Connectivity class problem |
| DISK-STAT UA_RST: | Unit attention reset count | TBD |
| DISK-STAT UA_NOT_RDY: | Unit attention - not ready | TBD |
| DISK-STAT HW_ERR: | Hardware errors reported back by drive | Drive problem |
| DISK-STAT NOT_RDY: | Drive not ready | TBD |
| DISK-STAT OTHER: | Other errors not in above | TBD |
| DISK-STAT TMO_ERR: | Timeout in SCSI layer | Seen in connectivity, media and absent failure classes |
| DISK-STAT DISK_FAILED: | SCSI status byte - queue full | TBD |
| DISK-STAT QUEUE_FULL: | SCSI queue full error | TBD |
| SCSI Soft Errors: | Count of soft errors | TBD |
| SCSI Bus Busy: | Count of SCSI bus busy errors | Uncorrelated |
| SCSI Timeouts: | Count of SCSI commands that did not complete in their timeout window | Timeouts are associated with both Medium and Connection failures |
| SCSI Reset Errors: | Count of SCSI resets | Associated with Medium, Connection, and Absent disk failures |
| SCSI No Connect: | Count of no-connect errors | Associated with Connection disk failures |
| SCSI CRC Errors: | Count of CRC errors returned by disks (TO DO: Verify) | Connection failures - TO DO: Verify |
| SCSI Not Ready: | Count of Not-Ready errors returned by drive | A correlation to which failure category needs to be made |
| SCSI Medium Errors: | Count of Medium errors at the SCSI level | Associated with Medium class failures. RAID count will largely match this count |
| SCSI Hardware Errs: | Count of SCSI hardware errors | Associated with disk failures - specific category to be determined |
| SCSI_Illegal_Request | Count of SCSI Illegal Request errors | This is normally seen during boot-up when the device is being discovered by the HBA driver |
| HBA Target Resets: | Count of disk resets performed by the HBA on behalf the SCSI driver | Associated with failure, exact correlation TBD |
| HBA Hotplug Events: | Add and removes of the device | Error recovery ping-ponging, connection problems and either self or induced drive power-cycling will cause this number to elevate |
| HBA Host Resets: | Count of HBA resets for HBA associated with this drive | Note this is a many-drives-to-one-HBA mapping, so an HBA reset by itself with no other errors is not an indication of a problem on this drive. If this indication is in the company of other errors it is usually the sign of severe drive problems. |
| HBA FW Errors: | Count of firmware errors for the HBA for this disk | Note this is a many-drives-to-one-HBA mapping, and is not by itself an indication of a problem on this drive. With other errors though it is indicative of connection or drive hardware failure |
| HBA Faults: | Count of HBA Faults | TBD |

The disk fault isolator, which may be represented by analysis module 152 of FIG. 2, uses a two level pattern naming and matching process. The top level is known as the "class", (media, absent, connection, other) each consisting of a set of patterns know as categories. Drive failure syndromes are named by class-letter, so CONN-S would be a connectivity class, with a preceding single-path condition.

Figure 3:
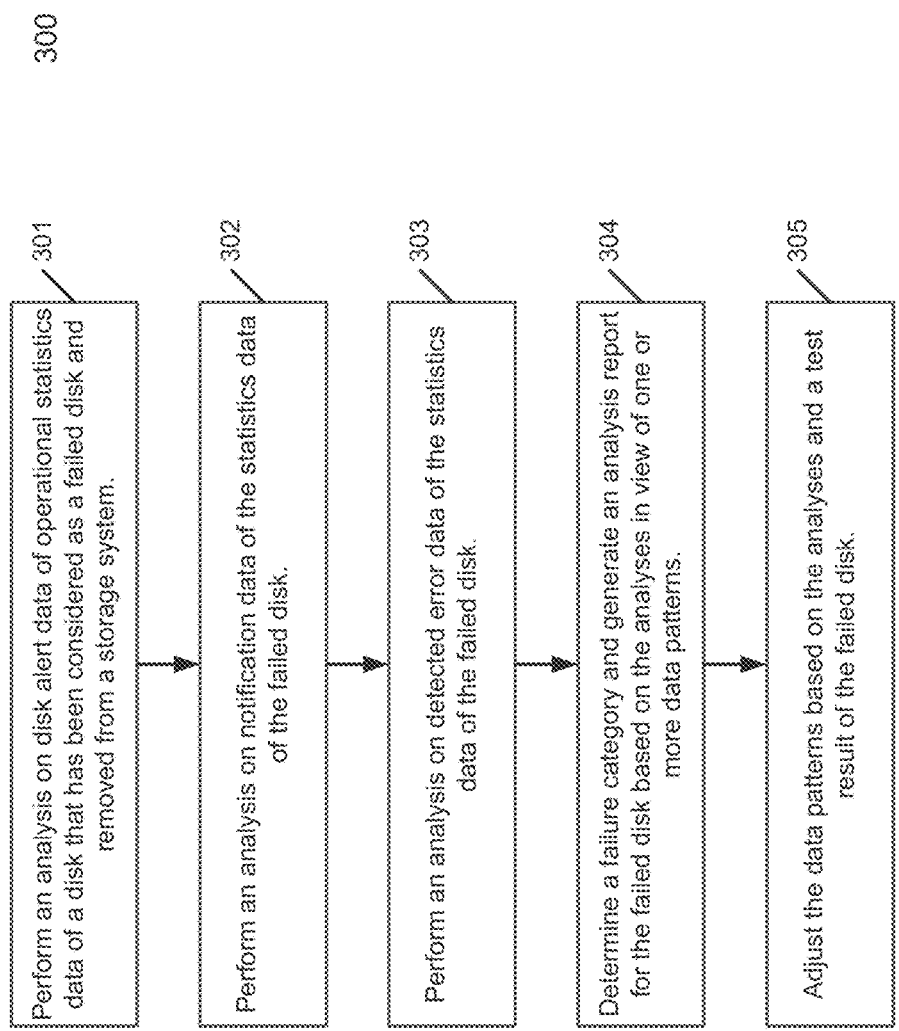
FIG. 3 is a flow diagram illustrating a process of isolating causes of disk failures according to one embodiment of the invention.

FIG. 3 is a flow diagram illustrating a process of isolating causes of disk failures according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by system 160 of FIG. 2. Referring to FIG. 3, at block 301, processing logic performs a first analysis on disk alert data of operational statistics data of an alleged failed disk. The disk has been considered as a failed disk and removed from a storage system. The operational statistics data has been collected periodically during operations of the storage system. At block 302, processing logic performs a second analysis on notification data of the operational statistics data of the failed disk. At block 303, processing logic performs a third analysis on detected error data of the statistics data of the failed disk. At block 304, processing logic determines a failure category based on the analyses and generate an analysis report for the failed disk in view of the one or more predetermined data patterns and a testing result of the failed disk. At block 305, the data patterns may be adjusted based on the analyses and the testing result.

Figure 4A:
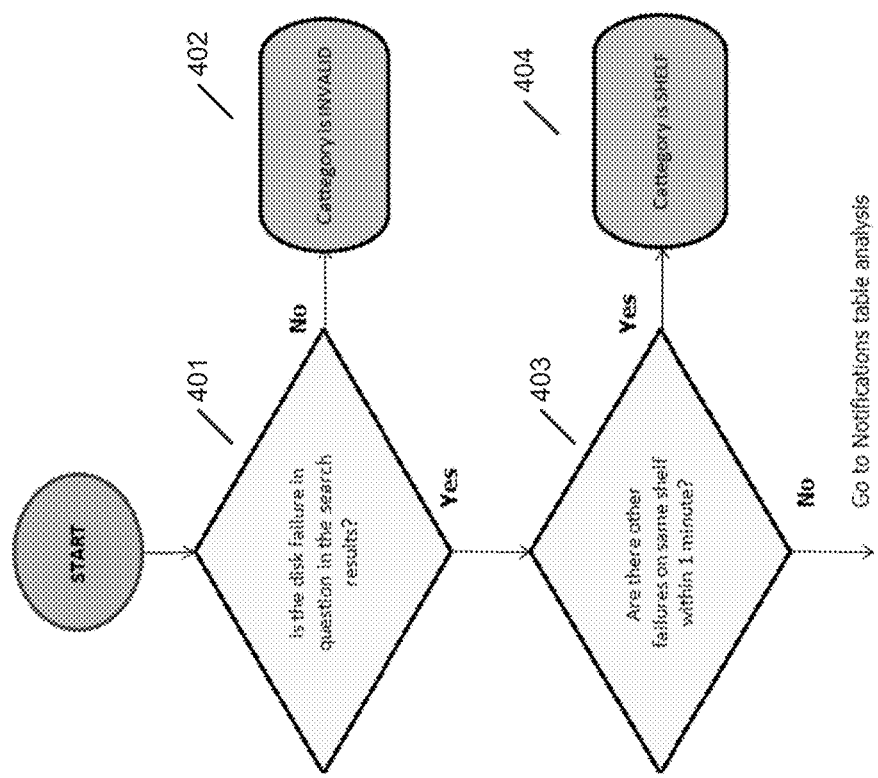
FIGS. 4A-4G are flow diagrams illustrating a process of categorizing disk failures according to certain embodiments of the invention.

FIGS. 4A-4G are flow diagrams illustrating a process of categorizing disk failures according to certain embodiments of the invention. The processes of FIGS. 4A-4G may be performed as part of process 300 of FIG. 3. Referring to FIG. 4A, which may be performed as part of the analysis on disk alert data performed at block 301 of FIG. 3, disk alert data is retrieved from a disk alert database (e.g., disk alert database 155). At block 401, processing logic determines whether the disk failure in question is in the statistics data. If not, at block 402, it is categorized as an invalid category. Otherwise, at block 403, processing logic determines whether there are other failures on the same shelf as of the failed disk in question within a predetermined period of time, in this example, one minute. If so, at block 404, the failure category is destined as a shelf category. A shelf refers to an enclosure that holds multiple disks, such as from 4 up to 60 drives.

Figure 4B:
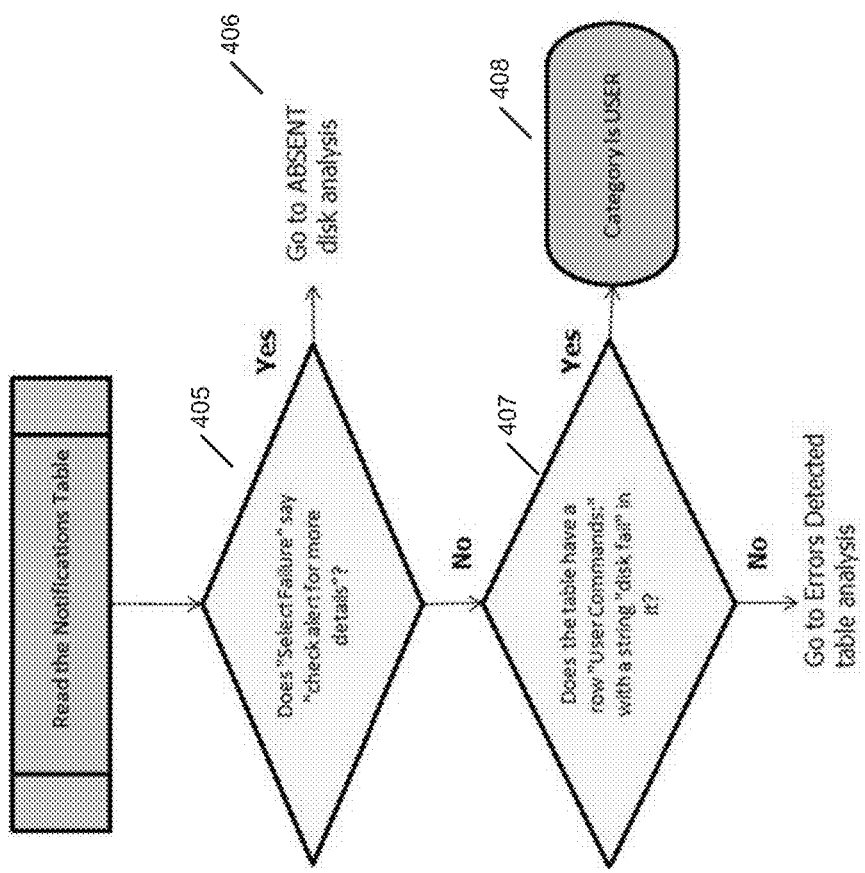
Figure 4C:
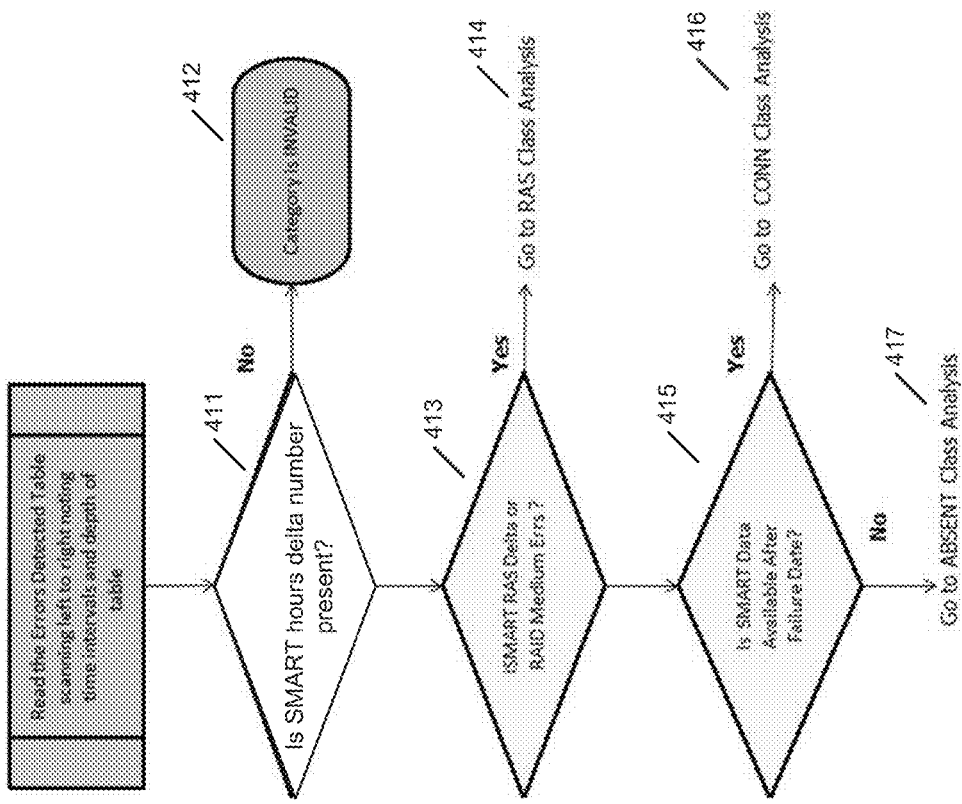
Figure 4D:
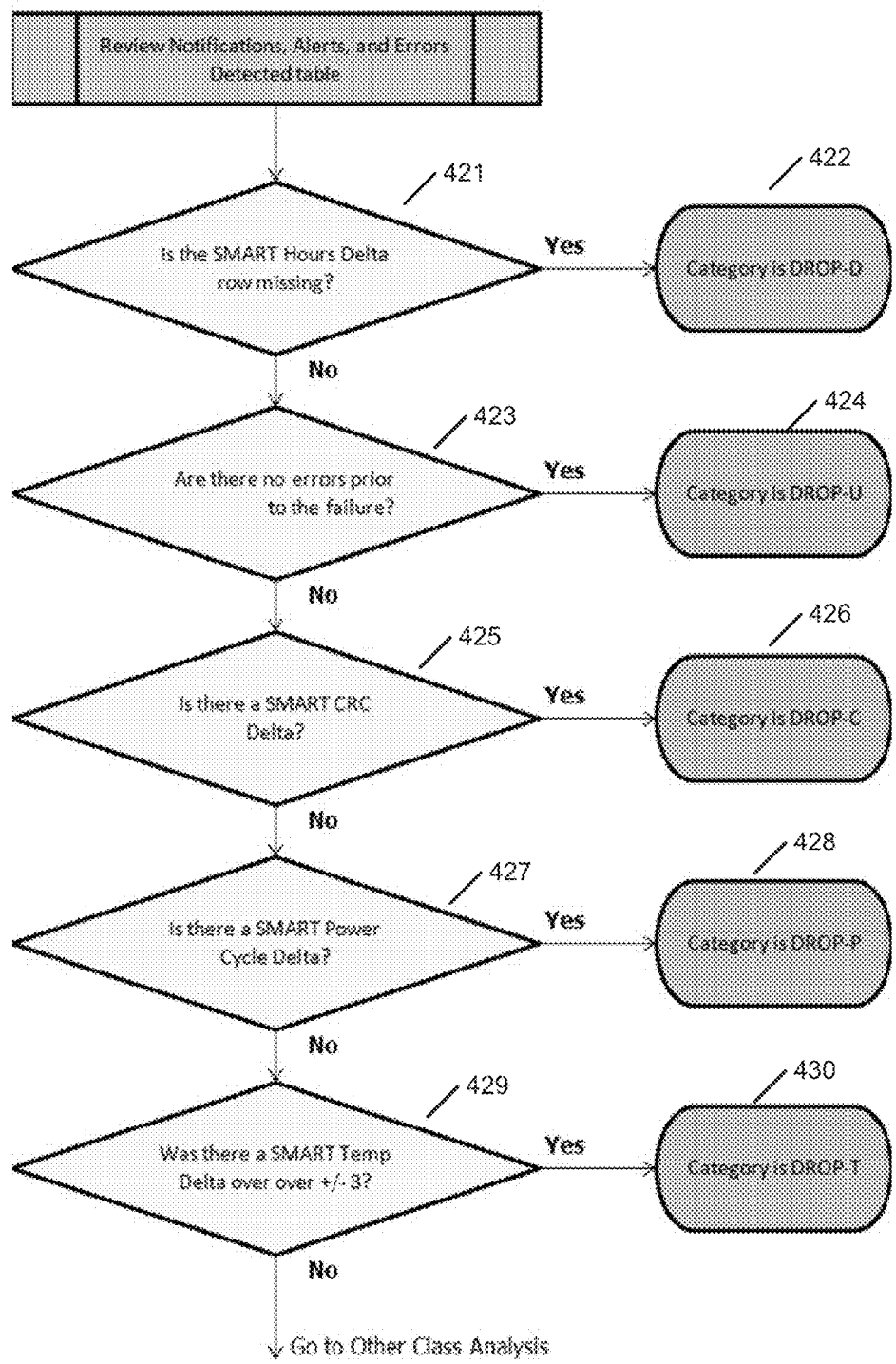

If there is no other disk failed on the same shelf for within the predetermined period of time, referring now to FIG. 4B (which may be part of operations of block 302 of FIG. 3), at block 405, processing logic determines whether the field of "selected failure" in the statistics data states "check alert for more details." If so, an absent disk or absent class analysis is performed at block 406 as shown in FIG. 4D. Otherwise, at block 407, processing logic determines whether the notification data (retrieved from notification database 156) contains a row of "user commands" having a string of "disk fail." If so, the disk failure is categorized as a user category at block 408. Note that, according to another embodiment, the operations of blocks 407-408 may be skipped, where the user category may be determined during the "other class" analysis as shown in FIG. 4E.

If the notification data does not contains a row of "user commands" having a string of "disk fail," referring now to FIG. 4C (which may be part of operations of block 303 of FIG. 3), at block 411, processing logic determines whether there is SMART hours delta numbers present. If not, at block 412, the disk failure is categorized as invalid. Otherwise, at block 413, processing logic determines whether the SMART hour delta is either RAS (reallocated sectors) delta or RAID (redundant array of independent disks) medium error. If so, a RAS class analysis is performed at block 414 as shown in FIG. 4F. Otherwise, at block 415, processing logic determines whether there is SMART data available after the failure date. If so, a connectivity class analysis is performed on block 416 as shown in FIG. 4G. Otherwise, at block 417, an absent class analysis is performed as shown in FIG. 4D. According to another embodiment, the operations of blocks 411-412 may be skipped, where an "invalid" class may be determined as a catch-all class after the system fails to determine a category of disk failures.

Referring now to FIG. 4D, which may be part of an absent class analysis, at block 421, processing logic determines whether there is SMART hour delta row missing in the operational statistics data. If so, at block 422, the disk failure is categorized as a DROP-D category. Otherwise, at block 423, processing logic determines whether there is no error prior to the disk failure. If so, at block 424, the disk failure is categorized as a DROP-U category. At block 425, processing logic determines whether there is any SMART CRC (cyclic redundancy checks) delta in the operational statistics data. If so, at block 426, the disk failure is categorized as a DROP-C category. At block 427, processing logic determines whether there is a power cycle delta in the operational statistics data. If so, at block 428, the disk failure is categorized as a DROP-P category. At block 429, processing logic determines whether there is SMART temperature delta over a predetermined range (e.g., +/−3) in the operational statistics data. If so, at block 430, the disk failure is categorized as a DROP-T category. Otherwise, processing logic performs other class analysis as shown in FIG. 4E.

Figure 4E:
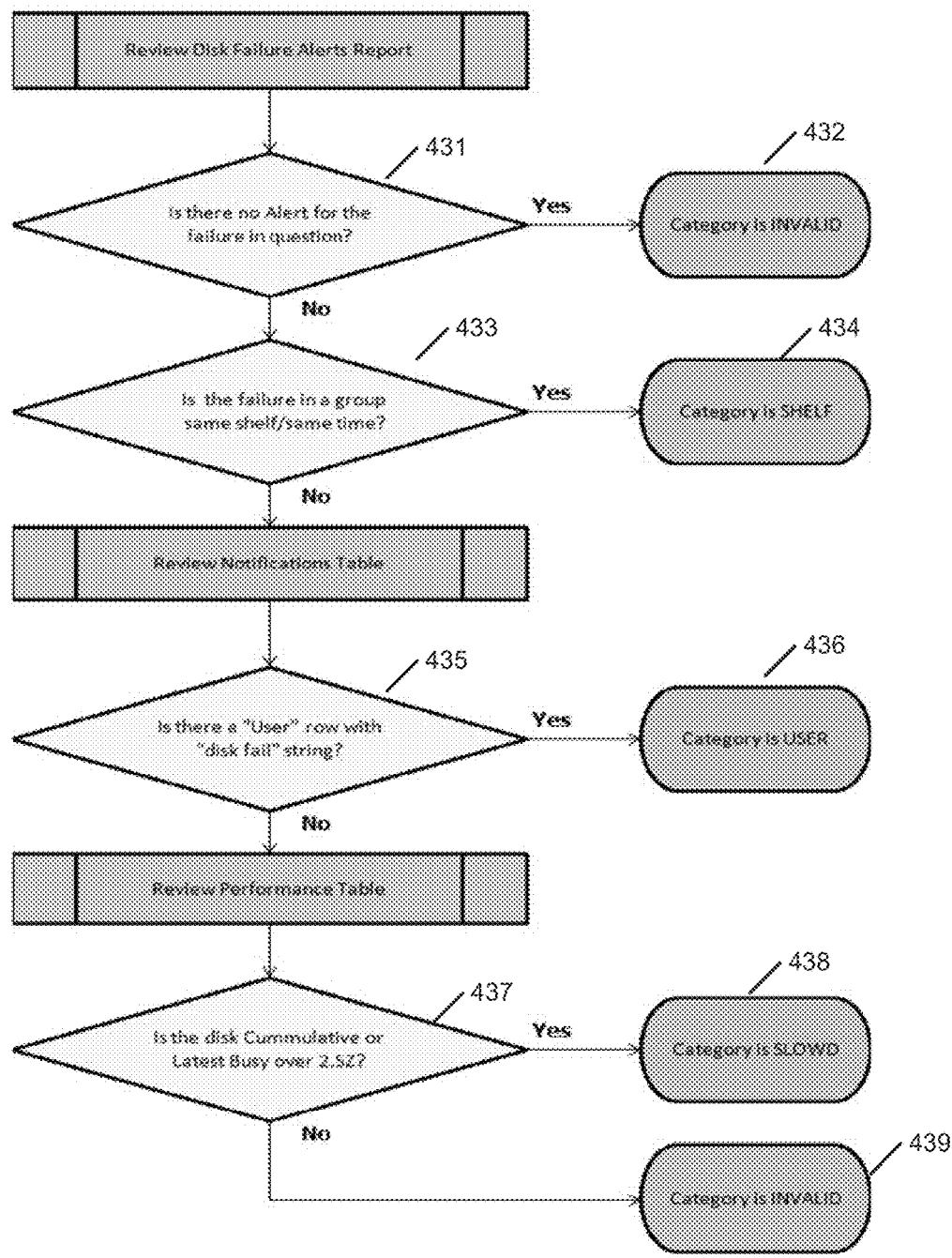
Figure 4F:
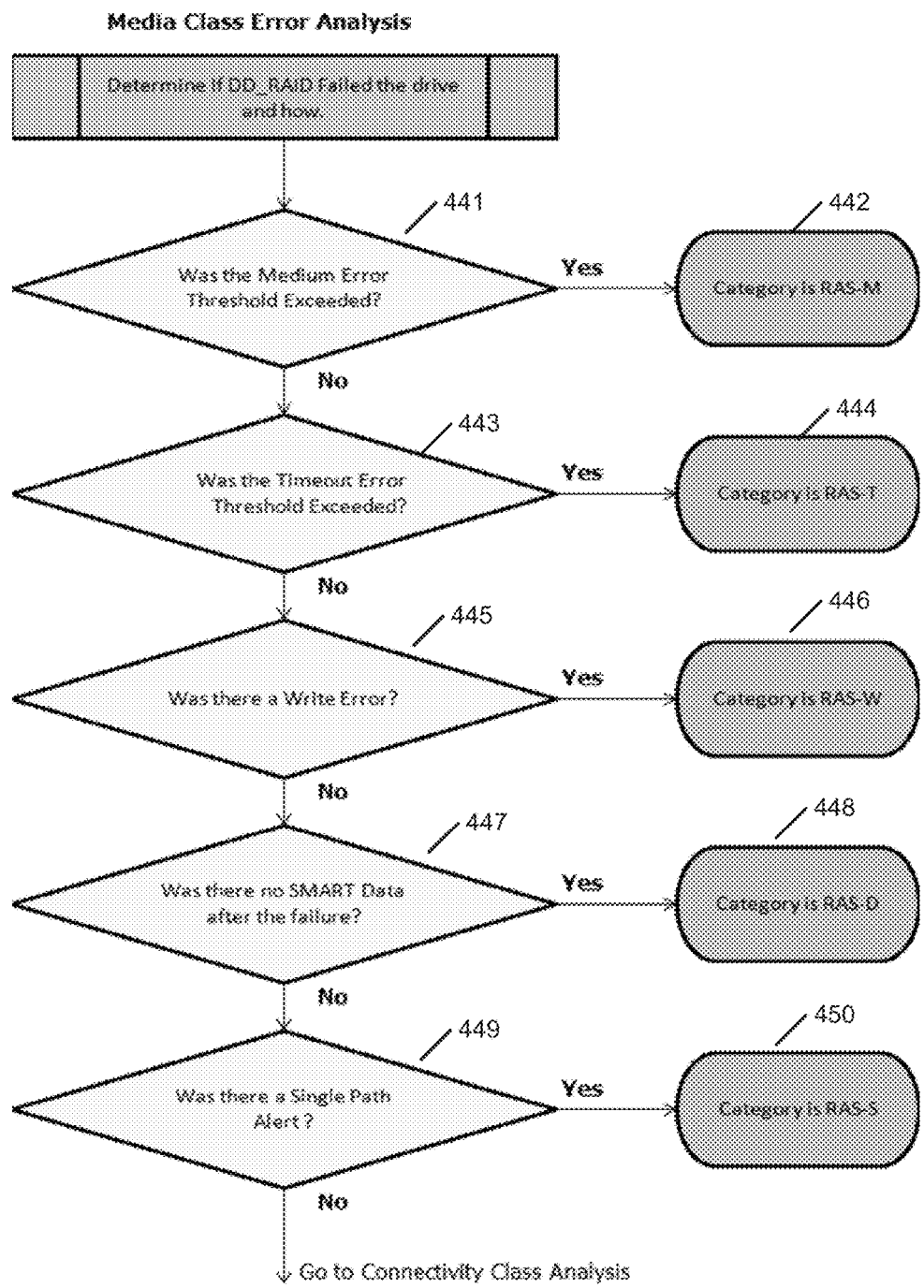
Figure 4G:
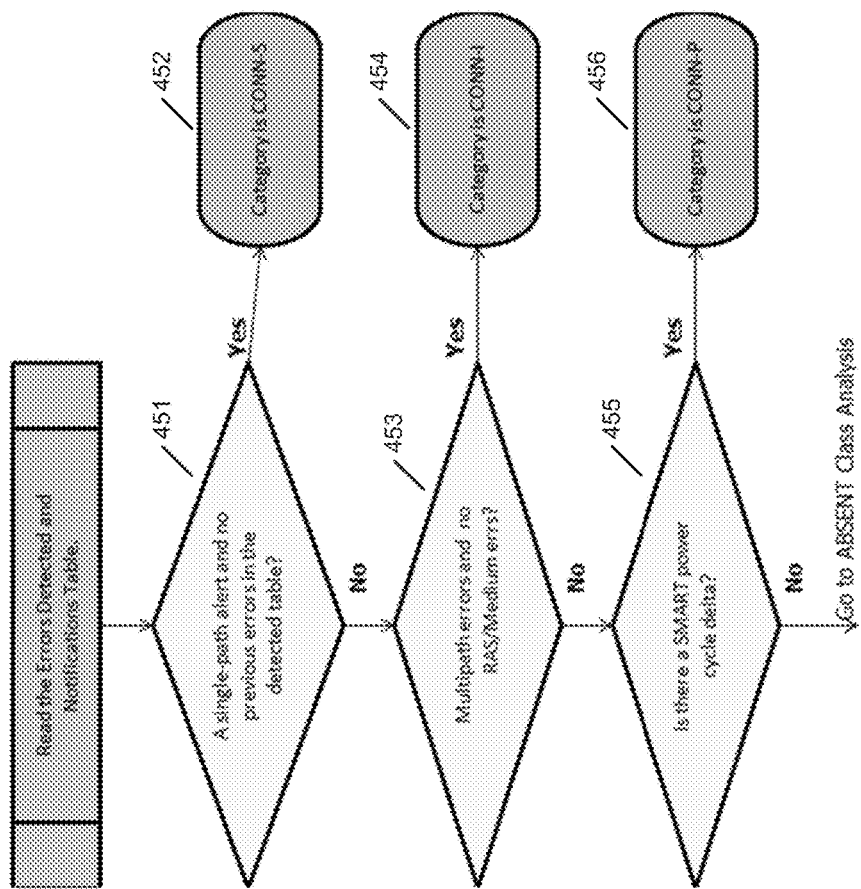

Referring now to FIG. 4E, at block 431, processing logic determines whether there is no alert in the in disk alert data. If so, at block 432, the disk failure is categorized as invalid. At block 433, processing logic determines whether there is a failure in a group of the same shelf around the same time. If so, at block 433, the disk failure is categorized as shelf category. At block 435, processing logic determines whether there is a "user" row with "disk fail" string in the notification data. If so, at block 436, the disk failure is categorized as a user category. At block 437, the processing logic determines whether there is disk cumulative or latest busy over a predetermined threshold (e.g., 2.5 Z). If so, at block 438, the disk failure is categorized as a SLOWD category; otherwise, the disk failure is categorized as an invalid at block 439.

Referring now to FIG. 4F, which represents a media class analysis, at block 441, processing logic determines whether the medium error threshold was exceeded. If so, at block 442, the disk failure is categorized as a RAS-M category. At block 443, processing logic determines whether the timeout error threshold was exceeded. If so, at block 444, the disk failure is categorized as RAS-T category. At block 445, processing logic determines whether there was a write error. If so, at block 446, the disk failure is categorized as a RAS-W category. At block 447, processing logic determines whether there was no SMART data after the failure. If so, at block 448, the disk failure is categorized as RAS-D category. At block 449, processing logic determines whether there was a single path alert. If so, at block 450, the disk failure is categorized as a RAS-S category. Otherwise, a connectivity class analysis is performed as shown in FIG. 4G.

Figure 5A:
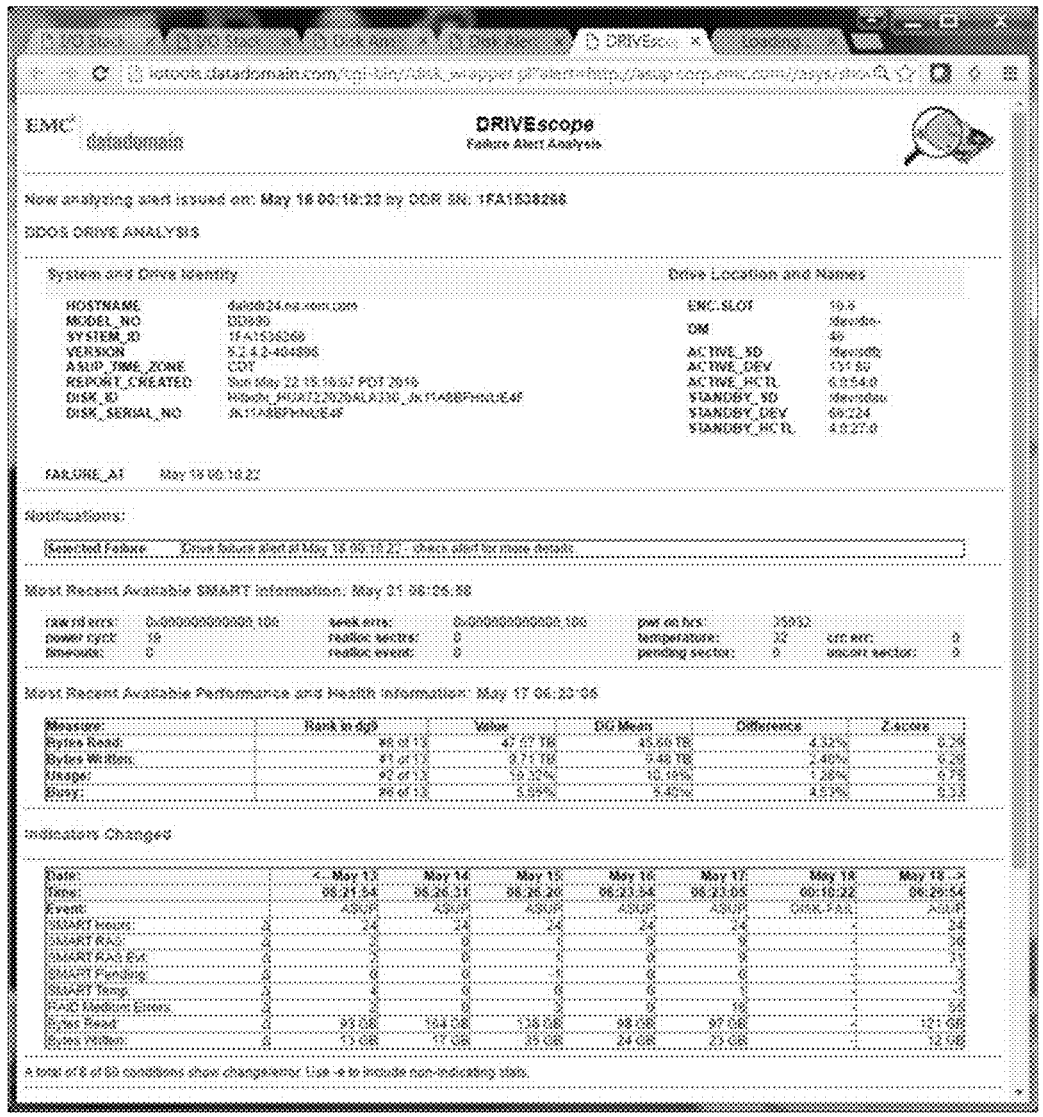
FIGS. 5A and 5B are screenshots representing a graphical user interface according one embodiment of the invention.
Figure 5B:
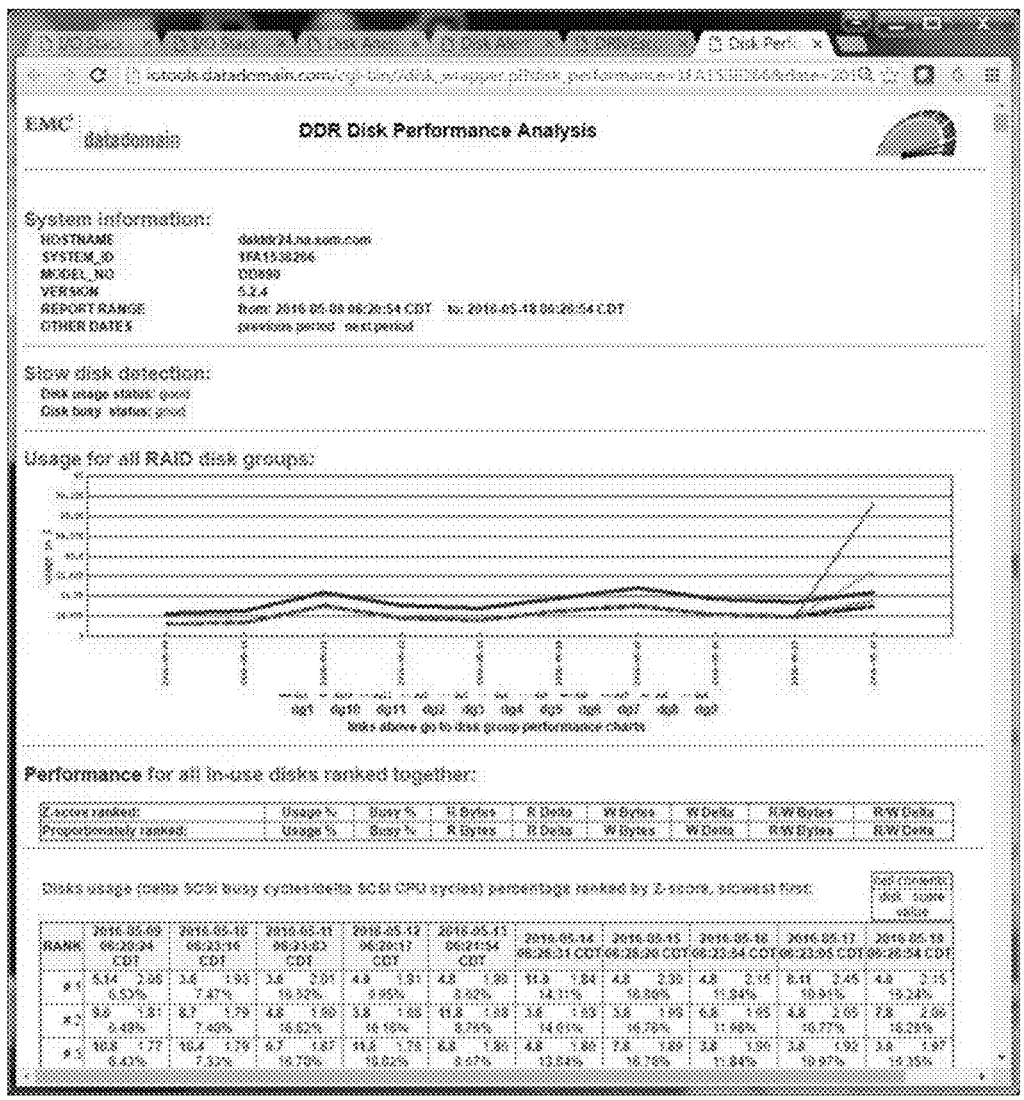

Referring to now to FIG. 4G, which represents a connectivity class analysis, at block 451, processing logic determines whether there was a single path alert and no previous errors in the error detected data (e.g., database 154). If so, at block 452, the disk failure is categorized as CONN-S category. At block 453, processing logic determines whether there were multipath errors and no RAS/medium errors. If so, at block 454, the disk failure is categorized as CONN-I category. At block 455, processing logic determines whether there is a SMART power cycle delta. If so, at block 456, the disk failure is categorized as CONN-P category. Otherwise, an absent class analysis is performed as shown in FIG. 4D. The results of the above analyses as shown in FIGS. 4A-4G can be summarized in a report that can be presented, for example, by reporting module 153 of FIG. 2, to a user in a graphical user interface such as FIGS. 5A and 5B, according to certain embodiments.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
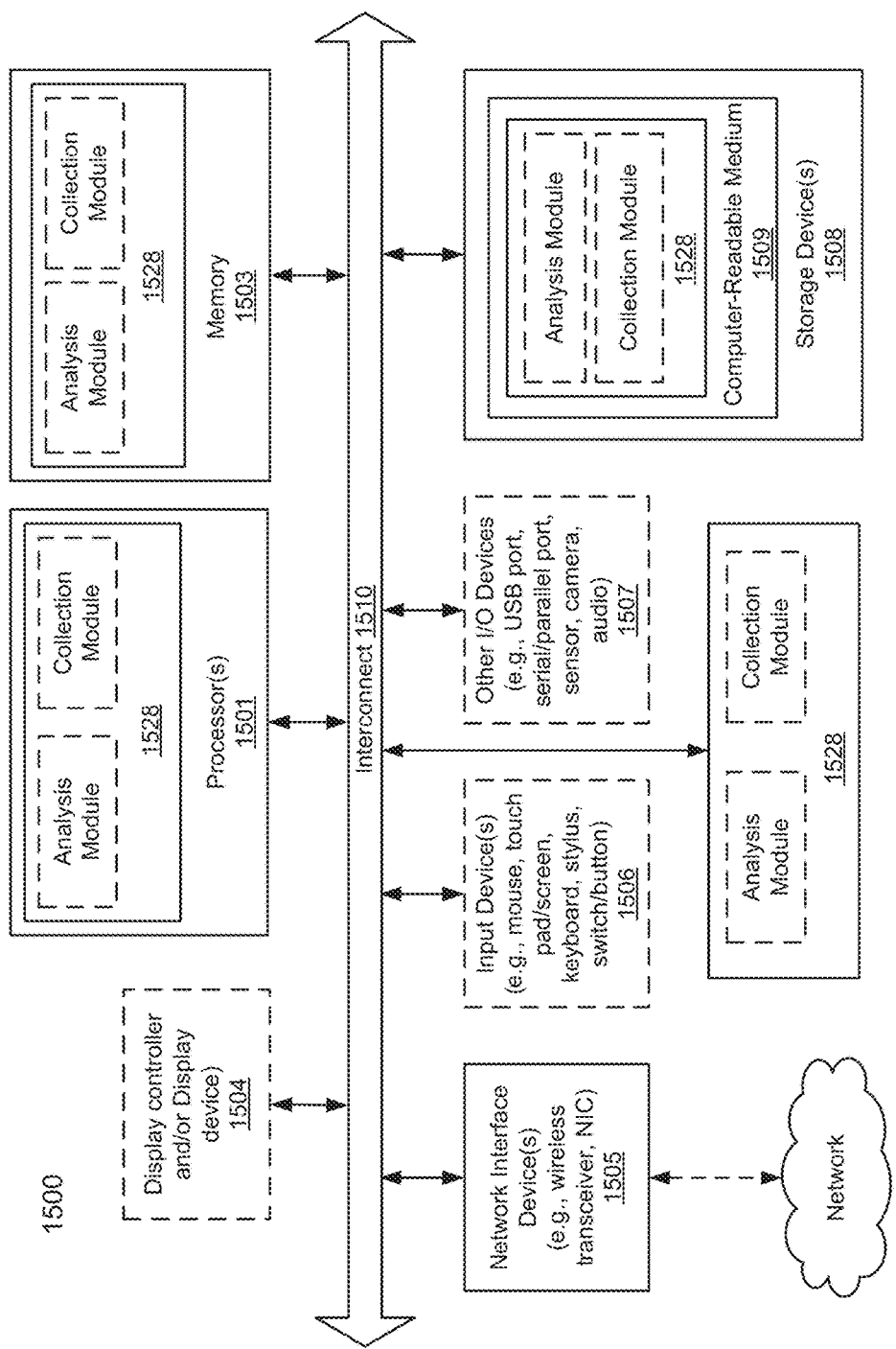
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for automatically determining categories of disk failures, the method comprising:
   receiving a test result of a first disk that was previously determined to be a failed disk, wherein the first disk was removed from a storage system and tested at a remote testing facility subsequent to the removal from the storage system, wherein the test result is generated at the remote testing facility;
   determining whether operational statistics data associated with the first disk identifies the first disk based on one or more predetermined data patterns, wherein the operational statistics data was periodically collected from the storage system during operations of the storage system, wherein the predetermined data patterns are compiled based on historic operational statistics data;
   in response to determining that the operations statistics data identifies the first disk, determining a failure category of the first disk other than an invalid category by comparing the operational statistics data against the predetermined data patterns; and
   adjusting at least one of the predetermined data patterns for subsequent determination of failure categories in view of the determined failure category and the test result,
   wherein determining the failure category of the first disk comprises: performing a reallocated sector (RAS) class analysis if detected error data of the operational statistics data contains RAS delta data or redundant array of independent disks (RAID) medium errors; performing a connectivity class analysis if there is self-monitoring, analysis and reporting technology (SMART) data available after a date of disk failure; and otherwise performing an absent class analysis.

2. The method of claim 1, wherein determining the failure category of the first disk further comprises:
   determining whether there is another failed disk on a disk shelf as of the first disk; and
   categorizing the disk failure as a shelf failure if there is another failed disk on the disk shelf.

3. The method of claim 1, wherein determining the failure category of the first disk further comprises:
   determining whether notification data of the operational statistics data indicates there is a need to examine further details;
   performing an absent class analysis if there is a need to examine further details;
   determining whether there is a user command in the disk alert data indicating a disk failure, if there is no need to examine further details; and
   categorizing the disk failure is a user failure in response to determining there is a user command existed.

4. The method of claim 3, wherein performing the absent class analysis comprises:
   categorizing the disk failure as DROP-D category if a SMART hours delta data is missing;
   categorizing the disk failure as DROP-U category if there is no prior error;
   categorizing the disk failure as DROP-C category if there is a SMART CRC delta existed;
   categorizing the disk failure as DROP-P category if there is a SMART power cycle delta existed; and
   categorizing the disk failure as DROP-T category if there is a SMART temperature delta existed.

5. The method of claim 1, wherein performing the RAS class analysis comprises:
   categorizing the disk failure as RAS-M category if a medium error threshold is exceeded;
   categorizing the disk failure as RAS-T category if an timeout error threshold is exceeded;
   categorizing the disk failure as RAS-W category if there is a write error;
   categorizing the disk failure as RAS-D category if there is no SMART data after the disk failure; and
   categorizing the disk failure as RAS-S category if there is a single path alert.

6. The method of claim 1, wherein performing the connectivity class analysis comprises:
   categorizing the disk failure as CONN-S category if there is a single-path alert and no previous error;
   categorizing the disk failure as CONN-I category if there are multiple errors and no medium error; and
   categorizing the disk failure as CONN-F category if there is a SMART power cycle delta.

7. A non-transitory machine-readable medium having instructions stored therein, which when executed by a processor, cause the processor to perform operations of automatically determining categories of disk failures, the operations comprising:
   receiving a test result of a first disk that was previously determined to be a failed disk, wherein the first disk was removed from a storage system and tested at a remote testing facility subsequent to the removal from the storage system, wherein the test result is generated at the remote testing facility;
   determining whether operational statistics data associated with the first disk identifies the first disk based on one or more predetermined data patterns, wherein the operational statistics data was periodically collected from the storage system during operations of the storage system, wherein the predetermined data patterns are compiled based on historic operational statistics data;
   in response to determining that the operations statistics data identifies the first disk, determining a failure category of the first disk other than an invalid category by comparing the operational statistics data against the predetermined data patterns; and
   adjusting at least one of the predetermined data patterns for subsequent determination of failure categories in view of the determined failure category and the test result,
   wherein determining the failure category of the first disk comprises: performing a reallocated sector (RAS) class analysis if detected error data of the operational statistics data contains RAS delta data or redundant array of independent disks (RAID) medium errors; performing a connectivity class analysis if there is self-monitoring, analysis and reporting technology (SMART) data available after a date of disk failure; and otherwise performing an absent class analysis.

8. The machine-readable medium of claim 7, wherein determining the failure category of the first disk further comprises:
   determining whether there is another failed disk on a disk shelf as of the first disk; and
   categorizing the disk failure as a shelf failure if there is another failed disk on the disk shelf.

9. The machine-readable medium of claim 7, wherein determining the failure category of the first disk further comprises:
   determining whether notification data of the operational statistics data indicates there is a need to examine further details;
   performing an absent class analysis if there is a need to examine further details;
   determining whether there is a user command in the disk alert data indicating a disk failure, if there is no need to examine further details; and
   categorizing the disk failure is a user failure in response to determining there is a user command existed.

10. The machine-readable medium of claim 9, wherein performing the absent class analysis comprises:
    categorizing the disk failure as DROP-D category if a SMART hours delta data is missing;
    categorizing the disk failure as DROP-U category if there is no prior error;
    categorizing the disk failure as DROP-C category if there is a SMART CRC delta existed;
    categorizing the disk failure as DROP-P category if there is a SMART power cycle delta existed; and
    categorizing the disk failure as DROP-T category if there is a SMART temperature delta existed.

11. The machine-readable medium of claim 7, wherein performing the RAS class analysis comprises:
    categorizing the disk failure as RAS-M category if a medium error threshold is exceeded;
    categorizing the disk failure as RAS-T category if an timeout error threshold is exceeded;
    categorizing the disk failure as RAS-W category if there is a write error;
    categorizing the disk failure as RAS-D category if there is no SMART data after the disk failure; and
    categorizing the disk failure as RAS-S category if there is a single path alert.

12. The machine-readable medium of claim 7, wherein performing the connectivity class analysis comprises:
    categorizing the disk failure as CONN-S category if there is a single-path alert and no previous error;
    categorizing the disk failure as CONN-I category if there are multiple errors and no medium error; and
    categorizing the disk failure as CONN-F category if there is a SMART power cycle delta.

13. A data processing system, comprising:
    a processor; and
    a memory coupled to the processor to store instructions, which when executed by the processor, cause the processor to perform operations, the operations including
      receiving a test result of a first disk that was previously determined to be a failed disk, wherein the first disk was removed from a storage system and tested at a remote testing facility subsequent to the removal from the storage system, wherein the test result is generated at the remote testing facility,
      determining whether operational statistics data associated with the first disk identifies the first disk based on one or more predetermined data patterns, wherein the operational statistics data was periodically collected from the storage system during operations of the storage system, wherein the predetermined data patterns are compiled based on historic operational statistics data,
      in response to determining that the operations statistics data identifies the first disk, determining a failure category of the first disk other than an invalid category by comparing the operational statistics data against the predetermined data patterns, and
      adjusting at least one of the predetermined data patterns for subsequent determination of failure categories in view of the failure category and the test result,
    wherein determining the failure category of the first disk comprises: performing a reallocated sector (RAS) class analysis if detected error data of the operational statistics data contains RAS delta data or redundant array of independent disks (RAID) medium errors; performing a connectivity class analysis if there is self-monitoring, analysis and reporting technology (SMART) data available after a date of disk failure; and otherwise performing an absent class analysis.

14. The system of claim 13, wherein determining the failure category of the first disk further comprises:
    determining whether there is another failed disk on a disk shelf as of the first disk; and
    categorizing the disk failure as a shelf failure if there is another failed disk on the disk shelf.

15. The system of claim 13, wherein determining the failure category of the first disk further comprises:
    determining whether notification data of the operational statistics data indicates there is a need to examine further details;
    performing an absent class analysis if there is a need to examine further details;
    determining whether there is a user command in the disk alert data indicating a disk failure, if there is no need to examine further details; and
    categorizing the disk failure is a user failure in response to determining there is a user command existed.

16. The system of claim 15, wherein performing the absent class analysis comprises:
    categorizing the disk failure as DROP-D category if a SMART hours delta data is missing;
    categorizing the disk failure as DROP-U category if there is no prior error;
    categorizing the disk failure as DROP-C category if there is a SMART CRC delta existed;
    categorizing the disk failure as DROP-P category if there is a SMART power cycle delta existed; and
    categorizing the disk failure as DROP-T category if there is a SMART temperature delta existed.

17. The system of claim 13, wherein performing the RAS class analysis comprises:
    categorizing the disk failure as RAS-M category if a medium error threshold is exceeded;
    categorizing the disk failure as RAS-T category if an timeout error threshold is exceeded;
    categorizing the disk failure as RAS-W category if there is a write error;
    categorizing the disk failure as RAS-D category if there is no SMART data after the disk failure; and
    categorizing the disk failure as RAS-S category if there is a single path alert.

18. The system of claim 13, wherein performing the connectivity class analysis comprises:
- categorizing the disk failure as CONN-S category if there is a single-path alert and no previous error;
- categorizing the disk failure as CONN-I category if there are multiple errors and no medium error; and
- categorizing the disk failure as CONN-F category if there is a SMART power cycle delta.

* * * * *